United States Patent [15] 3,651,253
Morgand et al. [45] Mar. 21, 1972

[54] VISUAL DISPLAY SYSTEM WITH DIGITAL STORAGE OF VIDEO INFORMATION

[72] Inventors: Jean Paul Morgand; Henri Magnan; Bernard Romagny, all of Paris, France

[73] Assignee: Thomson-CSF, Paris, France

[22] Filed: Feb. 17, 1970

[21] Appl. No.: 12,078

[30] Foreign Application Priority Data

Feb. 20, 1969 France....................................6904287
Dec. 17, 1969 France....................................6943699

[52] U.S. Cl............................178/6.6 A, 178/6.8, 340/324 A
[51] Int. Cl......................G08b 5/22, H04n 5/76, H04n 7/12
[58] Field of Search............178/6.6 A, DIG. 3; 340/173 MC, 340/324 A

[56] References Cited

UNITED STATES PATENTS

| | | | |
|---|---|---|---|
| 3,272,918 | 9/1966 | Koll | 178/6.7 R |
| 3,400,377 | 9/1968 | Lee | 340/324 A |
| 3,406,387 | 10/1968 | Werme | 340/324 A |
| 3,324,237 | 6/1967 | Cherry | 178/DIG. 3 |
| 3,145,369 | 8/1964 | Perschy | 340/173 MC |
| 3,377,423 | 4/1968 | Lippel | 178/DIG. 3 |
| 2,888,666 | 5/1959 | Epstein | 340/173 MC |

*Primary Examiner*—Howard W. Britton
*Attorney*—Cushman, Darby & Cushman

[57] ABSTRACT

A visual display system for visualizing an image represented by a video signal comprising an analogue-to-digital converter for translating this video signal into a digital signal, a memory for storing this digital signal while supplying it continuously and a digital-to-analogue converter connected to the memory and restituting an analogue image signal to a conventional display tube.

12 Claims, 11 Drawing Figures

VISUAL DISPLAY SYSTEM WITH DIGITAL STORAGE OF VIDEO INFORMATION

The present invention relates to a system for visual display of images which can be represented by sampled signals, such as, for example, sonar images.

The observation of a sonar image is difficult since this image moves as a consequence of the displacement of the vessel, this displacement being quite substantial taking into account the listening time required for the production of an image. This observation is also rendered difficult by flutter due to other phenomena such as echo fluctuation. However, it is necessary to have the possibility of sorting the echoes and therefore to obtain an image which is fixed throughout the time for which it is studied.

It is well known in this context to utilize a direct viewing memory tube, the storage time of which may be in the order of as much as 2 minutes. However, the manufacture of this kind of tube is always a delicate operation and the quality and faithfulness of reproduction of the image are not always perfect or constant during the whole of the display time. Moreover, the processing of signals is complicated.

It is an object of the invention to overcome these drawbacks.

According to this invention there is provided a visual display system for displaying on the screen of a display tube a steady image of an object in a relative movement in respect to a scanning means. The system for an exemplary embodiment includes a scanning means, e.g., a sonar system, producing an analog video image signal representative of successive different elements of the said scanned object and to which complementary data, e.g., a line sync, is added for further processing. Furthermore, means are provided for continuously converting (at discrete sampling instants) all possible amplitude levels of said signal into binary code quantized parallel signals each represented at the analog-to-digital converter output by a binary number comprising a plurality of digits of different significance, e.g., image signals, sync signals. A transmission link means embodied by a multielement memory system arrangement is also provided in parallel, for each digit of said quantized signal, and a memory element is provided with input means and control means, said memory comprising in a closed circulating loop, a delay element for each signal digit and delivering an output signal with a total time delay greater than a complete image duration and in synchronism with output signals issued from other memory elements, and processing and restoring means receiving continuously said parallel output signals and delivering the restored analog signal, further separated in an analog video image and in a line sync signals respectively applied to the appropriate terminals of a conventional display tube.

For a better understanding of the invention and to show how the same may be carried into effect, reference will be made to the drawings accompanying the ensuing description and in which.

Figures 1, 3:
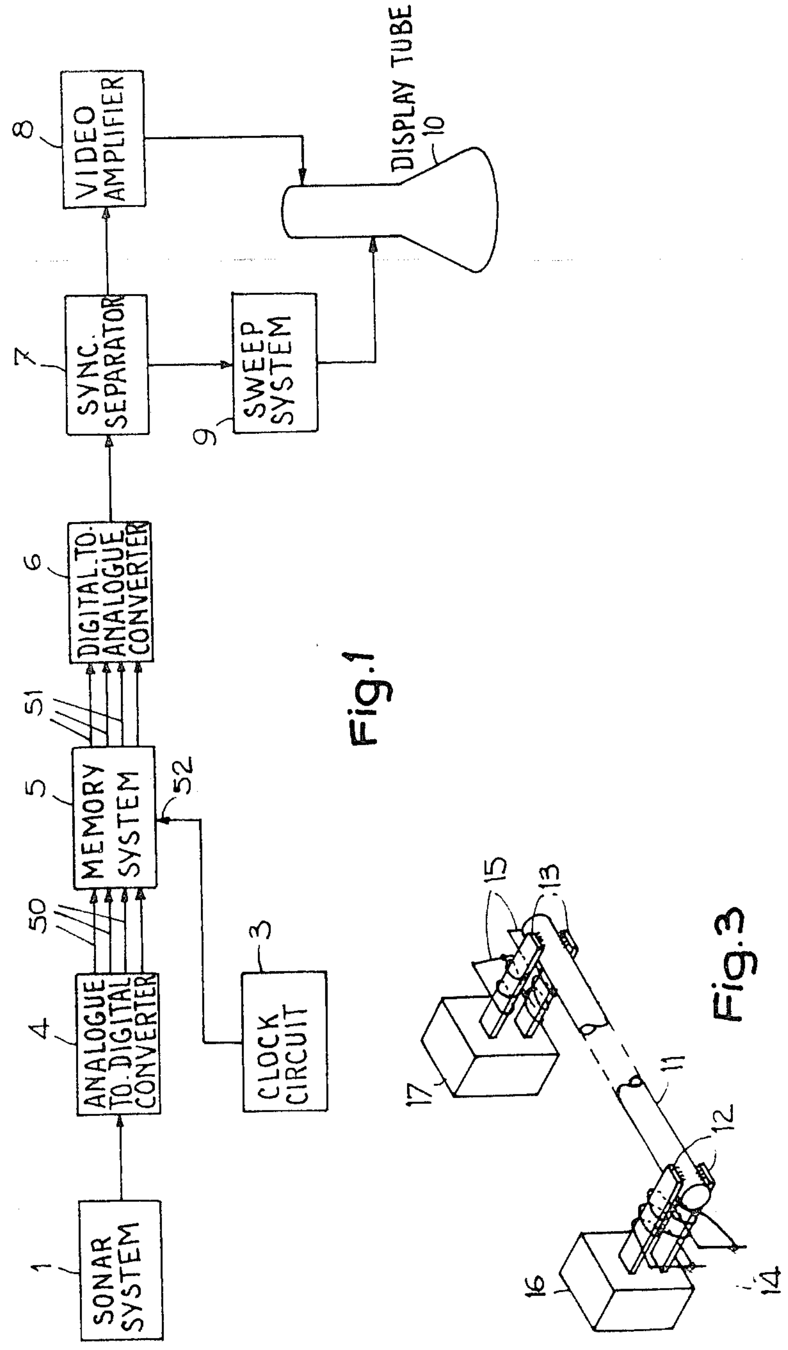
FIG. 1 is a schematic diagram of the system in accordance with the invention.
FIG. 3 illustrates a delay line which can be used in the memory of FIG. 2.

In FIG. 1 , a sonar system 1 produces at its output the image signal hereinbefore referred to, with its line sync signals, as in the case of a television signal. These image signals are supplied to an analogue-to-digital converter 4 which quantizes the signal in binary code by defining a certain number of signal levels each characterized by a binary number made up of digits supplied to the various outputs of the converter 4 . In the simple example considered, with four outputs and therefore four digits, 15 different levels are defined corresponding to the 15 binary numbers which can be made up with four digits (0 not included). These digits are applied to the four inputs 50 of a memory system 5 comprising four identical circulation memory elements respectively receiving the four digits. A high-frequency clock 3 (for example 1 mc./sec.) connected to a further input 52 of the memory system 5, serves to "chop" the received digits when the latter enter memory and to restore the phase at the output.

At the outputs of the memory system 5, the digits of the image signals are continuously collected while they continue to circulate in the memory elements. The digits thus picked up are supplied to the inputs 51 of a digital-to-analogue converter 6 which restores the analogue image signals.

These signals are transmitted to a sync signal separator 7, separating synchronizing signals supplied to the sweep system 9 of a conventional display tube 10, from the video image signals supplied to a video amplifier 8 and then to the beam intensity control electrode of the tube 10.

The operation of the system is as follows, referring also to FIG. 5 which illustrates a stepped wave form image test signal and clearly shows the different levels used for the binary coding :

The image signals are chopped into 15 levels (for example), the first three of which (although one might only use the first one for example), are reserved to the sync signals; the suppression level or black level is the level 4 and accordingly 12 levels (4to 15) are used for the image. Conversion is effected by the analog-to-digital converter 4 , the level 1 being represented by the four digits 0001, the level 2 by 0010 and so on. The converter may, for example, comprise 15 trigger circuits respectively triggered by the image signals when their amplitudes respectively pass the levels 1 to 15, these trigger circuits being followed by logic circuits producing the four digits, and all these circuits falling entirely within the scope of any person skilled in the art.

Self-evidently, the converter can be of any desired other type and in particular of the well known reversible counting type which gives a very fast counting rate and uses a reduced number of elements.

The digits obtained are stored in the circulatory memory elements, the latter comprising a delay circuit the output of which can, after regeneration and restoration of the phase of the signal, be connected to the input.

The delay time of the delay circuit of each memory element should be greater than the duration T of a complete image, namely 30 msec. in the example selected. Once the complete image signal has been introduced into the delay circuits, the input to these circuits is disconnected in order to prevent any further in-storage, and the loops between input and output are closed. In this way, the image signal recorded can be retained for as long as desired by continuously restoring it at the output of the memory elements.

Because of the fact that the duration T of a complete image signal is smaller than the delay time $T_1$ of the delay circuits, between the end of the delivery of a complete image signal at the output of the memory system 5 and the beginning of the next delivery cycle there elapses a time $T_1 - T$ which is chosen longer than the duration of the line sync pulses and which is detected as an image sync pulse at the output of the separator circuit 7.

In this fashion, an image which is fixed as long as the signal is retained in the memory system 5, is obtained.

Figure 2:
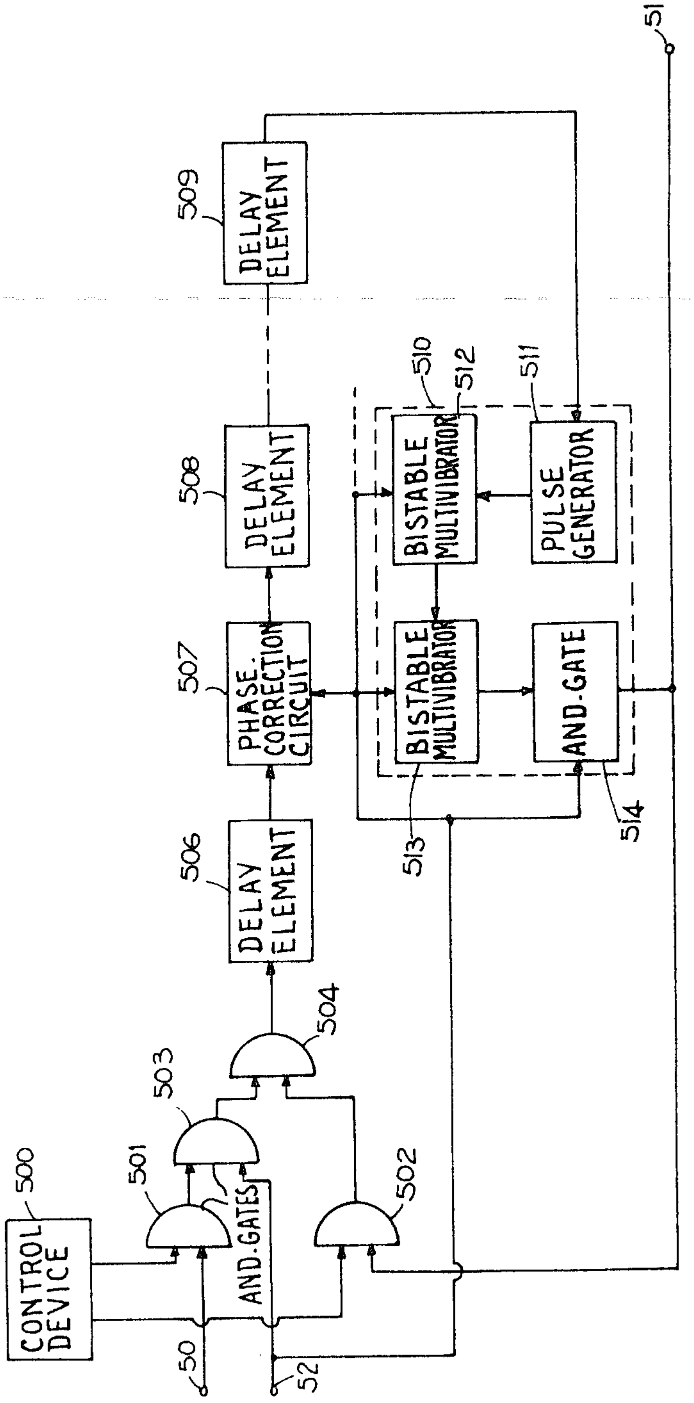
FIG. 2 is a partial diagram of one embodiment of the memory of the system of FIG. 1.

Bearing this in mind, in FIG. 2 a possible embodiment of a memory element required for the storage of the digits applied to one of the inputs 50, has been shown. This input is connected to the first input of an AND-gate 501 whose second input is connected to a control device 500 which may be either controlled by the operator or automatic. The output of the gate 501 is connected to the first input of an AND-gate 503 whose second input is connected to the input 52 receiving the pulses from clock 3 . The output of the gate 503 is connected to the first input of an OR-gate 504. Similarly, the output of the circuit 510, which is connected to the output 51 of the memory system, is also connected to the first input of an AND-gate 502 whose second input is connected to the control device 500.

The output of the gate 502 is connected to the second input of the OR-gate 504. The output of this circuit is connected to a first delay element 506 followed by a phase-correction circuit 507 and then by a second delay element 508 identical to the first, etc., then by a final delay element 509 followed by a phase-correction circuit 510.

For reasons of size and convenience of construction, $m$ identical delay elements may be used each giving a delay $T_1/m$ and each followed by a phase-correction circuit.

This is in particular the case if the delay elements are magnetostrictive delay lines such as those shown in FIG. 3. This kind of line cannot readily be used to obtain a delay of any more than around 10 msec. and thus, for an image duration of 30 msec., three of them have to be used per digit.

Returning now to FIG. 2, each phase-correction circuit comprises, like the circuit 510, a pulse generator 511 whose output is connected to the first input of a bistable multivibrator 512, whose second input receives the clock pulses. The output of the multivibrator 512 is connected to the first input of a second bistable multivibrator 513 which receives the clock pulses on its second input. The output of the multivibrator 513 is connected to the first input of an AND-gate 514, the second input of which receives the clock pulses.

Figure 6:
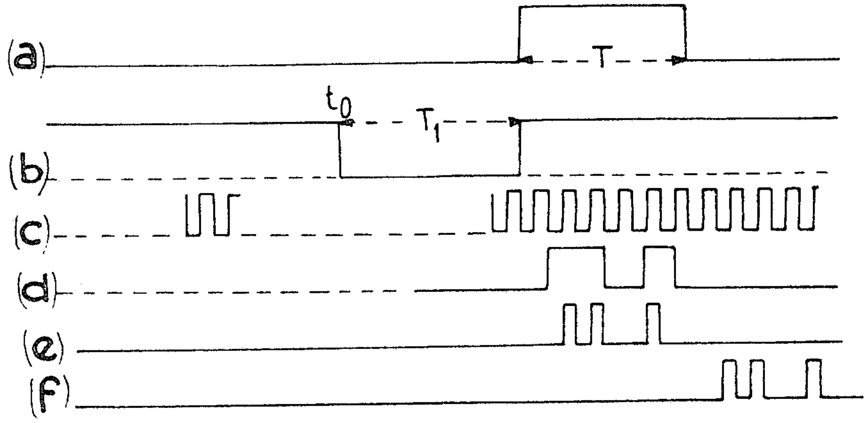

The operation of the system is as follows:

At the time $t_o$ the gate 502, normally unblocked on its second input for the transmission of the signals applied to its first input, receives from the control device 500 a blocking pulse of duration $T_1$ (FIG. 6*b*); the gate 501, normally blocked on its second input remains so. No signal is therefore transmitted to the input of the delay circuit 506. Under those conditions, during the time $T_1$ the delay elements discharge their contents. At the time $t_o + T_1$, all the memory elements will be empty. At this time, an unblocking pulse (FIG. 6*a*) of duration T is applied to the second input of the gate 501 by the device 500, while the gate 502, which is connected to the device 500, is no longer blocked by the latter.

The signal formed by the successive digits which are applied to the considered input 50 (FIG. 6*d*) is therefore transmitted to the gate 503 which chops it in the rhythm of the clock pulses (FIG. 6*c*) which are applied to the second input of the AND-gate 503. The resulting signal (FIG. 6*e*) is supplied to the first delay circuit 506 which, of course, in the conventional manner comprises the requisite matching circuits and shaping circuit at the output. The chopping of the input signal in the rhythm of the clock pulses results in a signal well matched to the characteristics of the delay lines used.

The output signal from the circuit 506 (FIG. 6f) is brought back into phase with the clock by the phase-correcting circuit 507. The latter circuit is identical with the circuit 510 whose operation will now be described.

Figure 7:
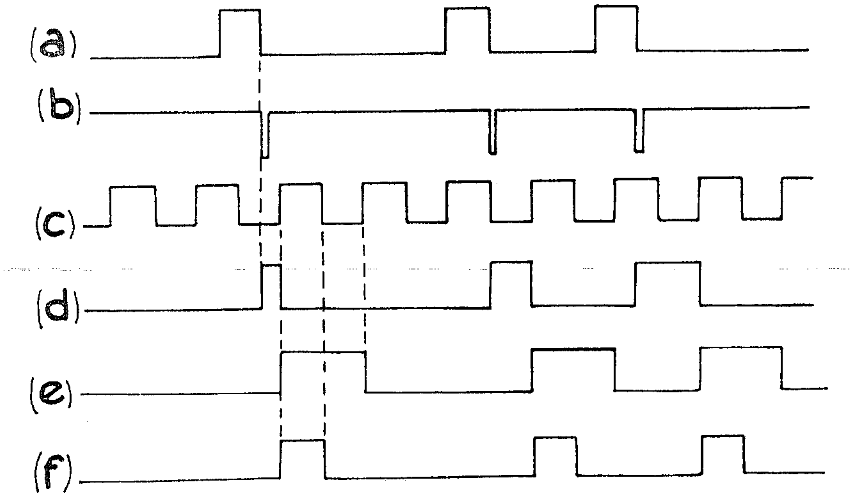

The signal coming from the delay circuit 509 has been shown in FIG. 7*a* in the form of pulses having different phase-shifts in relation to the clock signal (FIG. 7*c*), this in order to render the ensuing explanations clearer although, self-evidently, this is not what actually happens in reality since all the pulses are equally delayed by the delay circuit. The signal of FIG. 7*a* is thus applied to a circuit 511 which produces very narrow pulses (FIG. 7*b*) coincidentally with the decaying edge of the pulses of FIG. 7*a*.

This circuit may for example be a differentiating circuit. These narrow pulses trigger the change to the "1" state of the multivibrator 512 which is reset to its "0" state by the rising edge of the next clock pulse.

The multivibrator 513 is triggered into its "1" state by the decaying edges from the pulses (FIG. 7*d*) delivered by the multivibrator 512 and into its "0" state by the rising edges of the clock pulses, state "1" predominating in case of simultaneous triggering. Under those conditions, the signals delivered by the multivibrator 513 are as shown in FIG. 7*e*. Those are transmitted to the first input of the AND-gate 514, the other input of which is supplied with the clock pulses. The output signal (FIG. 7*f*) thus comprises pulses which are in phase with those of the clock and it is applied to the gate 502 which is kept open by the device 500. Through the medium of the OR-circuit 504, the output signal from the memory element is thus fed back to the input of the delay circuit 506 and can circulate and be retained as long as required, the gate 501 on the other hand having been closed at the end of the recording phase, by the control signal of FIG. 6*a*.

Self-evidently, there is provided for each output 50 of the converter 4 (FIG. 1) a memory element which is identical to that of FIG. 2, the control device 500 being common to all these memory elements.

By way of a delay circuit, the magnetostrictive delay line of FIG. 3 can be used. This comprises a steel wire 11 in which a torsion wave can propagate. Each end of the wire is fixed between two strips of magnetostrictive material, respectively marked 12 and 13, anchored in block 16 and 17. Each strip is surrounded by a coil, the two coils at any end of the wire 11 being wound in opposite direction and interconnected in parallel. A current applied through the input terminals 14 creates through the agency of the corresponding write-in coils, variations in extension in opposite directions, on the part of the magnetostrictive strips 12 so that a torsion wave is transmitted through the wire 11. This wave, at the other end of the wire 11, creates corresponding variations in length on the part of the strips 13 so that a signal is induced in the coils there and collected between the terminals 15.

Self-evidently, other kinds of delay circuits may be used.

It should be emphasized that a digital image signal has this advantage that any processing of the image is thus made particularly simple. In particular, it can be arranged that in accordance with a predetermined law there corresponds with the $n$ digits representing each signal level, N other digits. In particular, if $x$ designates the amplitude of the image signal at a given point, it is appropriate, where a sonar image is concerned to arrange for this to correspond upon the screen of the display tube to an image the signal representative of which has, at this point, an amplitude $1/x$, this for reasons associated with display quality and eyestrain.

Figure 4:
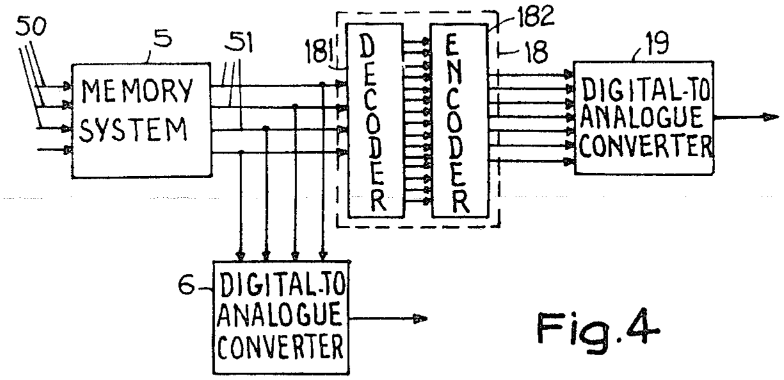
FIG. 4 is the diagram of an application of the system in accordance with the invention.

This kind of application is shown in FIG. 4 where similar references relate to similar elements to those used in the foregoing figures. From the four digits of the image signal $x$, the converter 18 produces a signal $1/x$ represented by seven digits, this in accordance with a principle which will be set out in more detail hereinafter. The signal is subsequently restored to analogue form by a digital-to-analogue converter 19. Thus, it is possible to select either the normal image signal at the output of the converter 6 or the contrast inverted image signal at the output of the converter 19.

The contrast inversion is only applied to the signal beyond the first level which produces a display screen brightness other than zero, that is to say starting from the level 5 in the example chosen. This level is assigned a value 100, hence the choice of seven digits for the representation of the signal.

The original levels 1 to 4 are only transposed by +4.

This gives us the following conversion table :

| Level of the x signal | Representation in the $\frac{1}{x}$ form | 4 digits of the x signal | 7 digits of the $\frac{1}{x}$ signal |
|---|---|---|---|
| 5—1st inverted level | $\frac{100}{1}=100$ | 0 1 0 1 | 1 1 0 0 1 0 0 |
| 6—2nd inverted level | $\frac{100}{2}=50$ | 0 1 1 0 | 0 1 1 0 0 1 0 |
| 7—3rd inverted level | $\frac{100}{3}=33$ | 0 1 1 1 | 0 1 0 0 0 0 1 |
| 8—4th inverted level | $\frac{100}{4}=25$ | 1 0 0 0 | 0 0 1 1 0 0 1 |
| 9—5th inverted level | 20 | 1 0 0 1 | 0 0 1 0 1 0 0 |
| 10—6th inverted level | 17 | 1 0 1 0 | 0 0 1 0 0 0 1 |
| 11—7th inverted level | 14 | 1 0 1 1 | 0 0 0 1 1 1 0 |
| 12—8th inverted level | 13 | 1 1 0 0 | 0 0 0 1 1 0 1 |
| 13—9th inverted level | 11 | 1 1 0 1 | 0 0 0 1 0 1 1 |
| 14—10th inverted level | 10 | 1 1 1 0 | 0 0 0 1 0 1 0 |
| 15—11th inverted level | 9 | 1 1 1 1 | 0 0 0 1 0 0 1 |

| | | | |
|---|---|---|---|
| 4—Noninverted levels | 8 | 0 1 0 0 | 0 0 0 1 0 0 0 |
| 3 | 7 | 0 0 1 1 | 0 0 0 0 1 1 1 |
| 2 | 6 | 0 0 1 0 | 0 0 0 0 1 1 0 |
| 1 | 5 | 0 0 0 1 | 0 0 0 0 1 0 1 |

Figure 5:
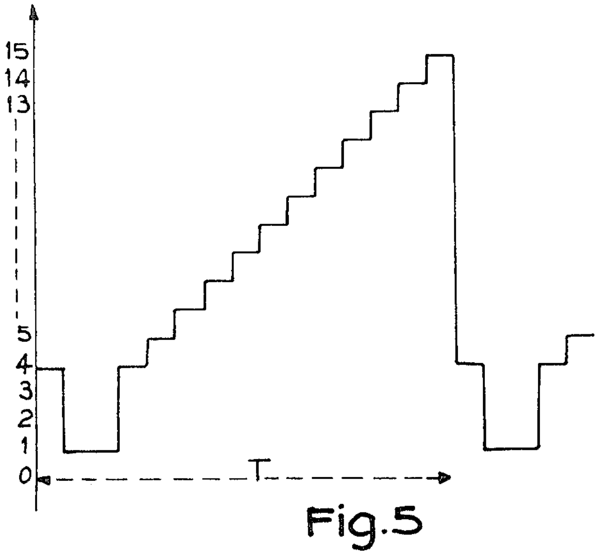
FIGS. 5, 6, 7 and 8 are explanatory graphs.
Figure 8:
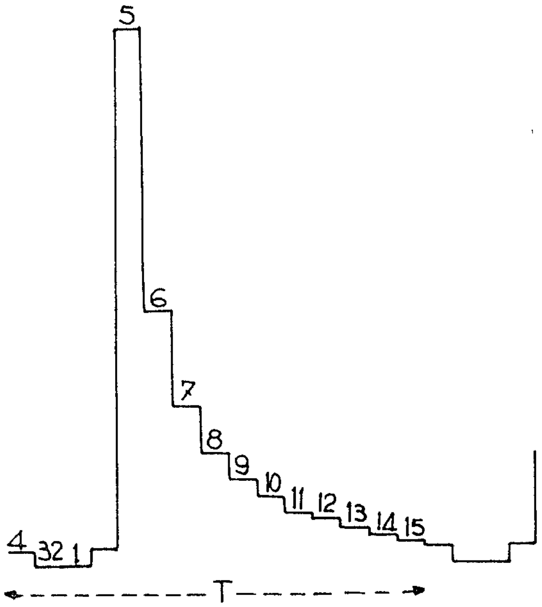

In FIG. 8, the signal of FIG. 5 after processing in accordance with the principle hereinbefore enumerated, has been illustrated. This kind of processing is effected by the converter 18 using simple logic circuits which are within the scope of any person skilled in the art and which carry out the conversion function indicated in the last two columns of the table. For example, it is possible to carry out this conversion by first of all carrying out decoding using a decoder 181 (FIG. 4) with 15 outputs corresponding respectively to the 15 possible input binary numbers, only that output whose position number is equal to the input number being energized at any time.

An encoder 182, whose 15 inputs are respectively connected to the 15 outputs of the decoder 181, supplies on its seven outputs the binary number corresponding to its energized input. For example, the output delivering the digit of lowest weight will be coupled to those inputs whose position numbers are 7, 8, 10, 12, 13, 15, 3 and 1.

It would equally be possible to use a reversible-counting system for the converter 18.

Figure 9:
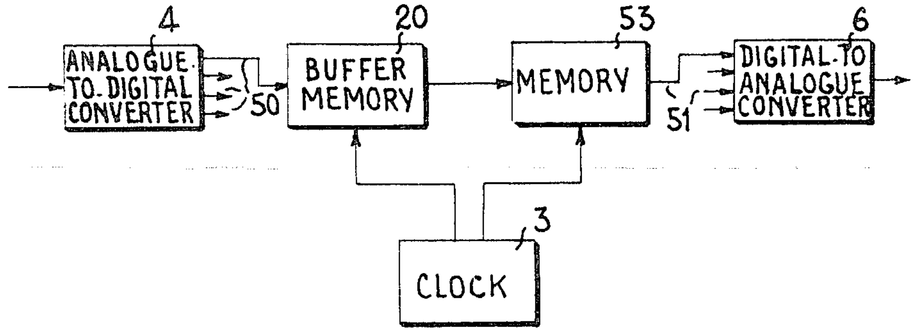
FIGS 9 to 11 show variants of the system.

FIG. 9 shows a variant of the system according to the invention wherein a system of buffer memories is located between the analog-to-digital converter 4 and the memory system 5 so as to make possible an easy regeneration of the image stored in the memory system 5 or the obtaining of a continuous crawling of the image.

In the figure, in order not to overburden the drawing, only the circuits corresponding to a single output of the converter 4 have been shown. This output is connected to a circulating memory element 53 of the main memory system through a buffer store 20.

The output of element 53 is connected to one of the inputs 51 of the digital-to-analogue converter 6. The memories 20 and 53 are connected to the clock 3.

The operation of the system is as follows:

The image signal comprises successive portions, $A_1$, $A_2$ ... $A_p$, of equal duration respectively corresponding to image elements, which will also be designated $A_1$, $A_2$ ... $A_p$. It is assumed here, by way of example, that those elements are lines. Each image signal $A_i$ ($i = 1,2 ... p$) comprising $n$ digits, is successively recorded in the set of buffer stores 20 (only one has been shown) and subsequently transmitted to the memory system 53 at times controlled by the clock 3. When the memories 53 contain the whole of the image, that is to say, the $p$ signals $A_1$, $A_2$ ... $A_p$, it is then possible to erase the first signal portion $A_1$ and substitute it by the portion $A_{p+1}$ corresponding to the next image, then to replace $A_2$ by $A_{p+2}$, and so on.

If the image sync signal at the output of the memories 53 is associated with the first fraction of each image (i.e., with $A_1$, $A_{p+1}$, $A_{2p+l}$ ...), the image obtained on the display tube will be fixed and will be continuously regenerated.

On the other hand, if the image sync signal is associated at each instant, with the last image fraction which has just been substituted, then there will be a one-line shift of this sync signal in the image (this shift being separated from the next by the readout of a complete image), and thus continuous crawling of the image across the screen of the display tube, is obtained.

The memories 20 can be constituted, for example, by shift registers (for example of the MOS kind).

These kinds of memories can be used to effect compression of the image input signal.

Figure 10:
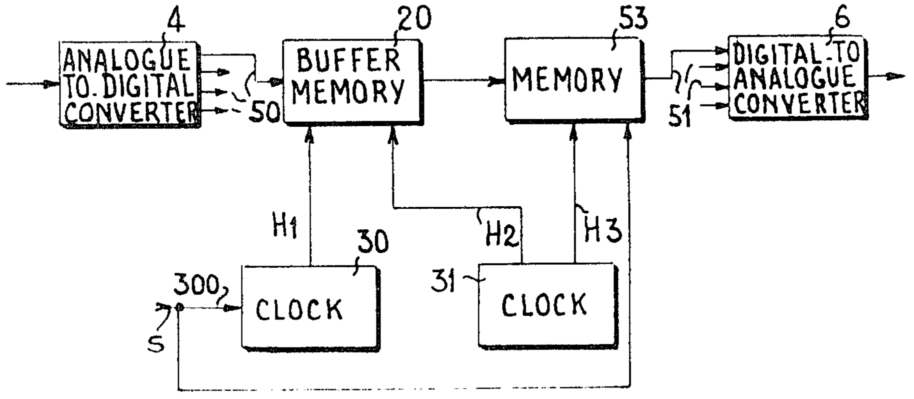

In FIG. 10, a variant embodiment has been illustrated which, by its use of the buffer stores, makes it possible to prevent instabilities in the system which produces the input image signal from affecting the image shown by the display tube.

For this purpose, a first clock 30 supplies to the memory 20 a signal $H_1$ controlling write-in into the buffer store 20. This clock is synchronized by a sync signal S applied to its input 300 and coming from the system which generates the input image signal, thus making it possible to synchronize the operation of write-in into the memory 20, with the image signal which is to be written in. This sync signal S is on the other hand applied to the memory 53 in order that an image fraction is transferred from memory 20 to memory 53 only when write-in into the memory 20 has been completed.

The readout control input of the buffer store 20 and that of the memory 53, are respectively supplied with the clock signals $H_2$ and $H_3$ from an independent clock 31 which produces a stable time reference associated with the memory 53 and independent of the input image signal.

Figure 11:
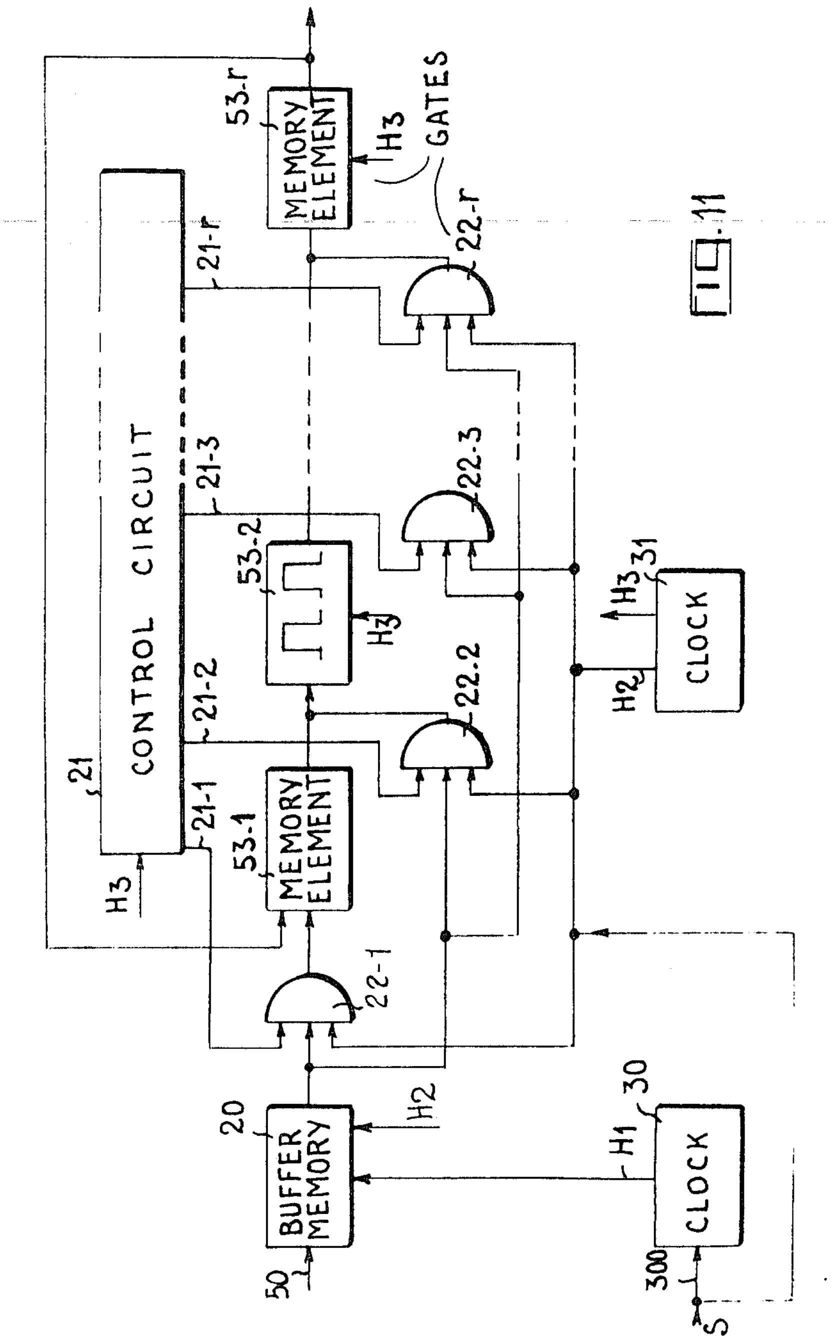

FIG. 11 illustrates the diagram of a variant embodiment derived from that of FIG. 10, which makes it possible to compensate for possible instabilities in the input image signal. In order to be able more easily to select the instant of transfer of an image signal fraction to the memory 53, the latter is subdivided into $r$ memory circuit elements in series 53–1 to 53–$r$, each additionally having a parallel input controlled by a gate 22–1 to 22–$r$. The output of the final circuit element 53–$r$ is connected to the input of the first circuit element 53–1, in order to enable data to circulate in the memory 53. The output of the buffer store 20 is connected in parallel to one input of each of the gates 22–1 to 22–$r$. Each gate furthermore has two control inputs, one receiving the sync signal S and the other a control signal coming from the corresponding output of the circuit 21.

The operation of the system is as follows:

Let $t_1$ be the time duration of write-in of an image signal portion into the buffer store 20 and $t_2$ the time duration of readout from the memory 20 and of simultaneous write-in of this signal portion into an element of the memory 53.

Assuming that time compression is effected, $t_2$ is very substantially shorter than $t_1$.

If $t_3$ designates the time interval between the end of one write-in operation and the start of the next operation of write-in into the memory 20, then the delay time $t$ of each memory circuit element 53–1, ..... 53–$r$, will be chosen substantially larger than $t_2$ and indeed in such a fashion that $t_3 \geqslant t + t_2$ applies. It is then ensured that the position in which the signal portion, which is to be transferred from the memory 20 to the memory 53, should be written into the memory 53, will appear (at least once) at the input of a given circuit element 53–1 to 53–$r$, of the memory 53, during the time $t_3$. It is thus possible to transfer the image fraction into this given element prior to a new process of write-in of a new image signal portion into the buffer store 20. This transfer into the desired element can be effected due to the switching operation carried out by the gates 22–1 to 22–$r$ under control of sync signal S and a signal provided at a corresponding output 21–1 to 21–$r$ of control circuit 21. In order to control the gates operation, the sync signal S provides, during the time $t_3$, the write-in period in the elements 53 while signals provided by circuit 21 open systematically said gates each time that the write-in position of the image signal fraction occurs at the input of the corresponding memory circuit elements 53–1 to 53–$r$. To this end, the control circuit 21 comprises a counter means of predetermined count capacity which receives the control pulses $H_3$ from the clock 31. The counter means is made up of two series-connected parts, the first one registers cyclically the count of said pulses $H_3$ corresponding on completion to the delay time $t$ of one memory circuit element such as 53–1 and the second part, having a capacity $r$ corresponding to the number of memory circuit elements of 53, receives the advance pulses (i.e., carryover) produced by the first part on count completion. The possibility of write-in into the memory circuit elements is indicated on count completion by the passage through zero of the contents of the first part of the counter, this passage produces an advance pulse applied successively to the individual parts of the second part of the counter 21. A corresponding unblocking timing pulse therefore appears at its individual parts outputs and is applied to respective gates. If, at this instant, the sync signal S is present, transfer will take place when write-in is caused by the signal $H_2$. Thus in this system of control, the coincidence of control pulses $H_2$ and 21–1 or 21–2 or ... **21–*r* on control inputs of the successive gates 22–1, .. 22–*r* opens said gates in a sequence in accordance with the displacement of the write-in position of signal image fractions through the circuit elements of the memory 53, Finally, the circuit 21 includes a "zero reset" device which causes the counting cycle of the counter to start again from zero with the end of each event of write-in into the memory 53, the memory element 53–1 to 53–*r*** which serves as origin for the counter, being that at which write-in has just taken place.

If $t_3$ is less than $t + t_2$, it is nevertheless possible to use the same system, provided that, instead of a single buffer store 20, two identical parallel-operated stores are used. The signal image fractions are then recorded alternately in one or the other and the time of write-in into one of the stores corresponds to the interval between two events of write-in into the other. Thus, artificially an interval $t_3$ which is greater than $t + t_2$ is created.

In particular, although the case of a sonar image has been chosen by way of example here, it goes without saying that the invention applies equally to any system which produces a signal for display, which can be analyzed by sampling.

What is claimed is:

1. A visual display system for displaying a steady image on the screen of a display tube, said image being of an object in a relative movement with respect to a scanning means which generates the image, said system comprising:

a scanning means for producing an analog video image signal representative of successive different elements of the said scanned object and to which complementary synchronization data is added for further processing, analog-to-digital converter for continuously converting, at discrete sampling instants, the possible amplitude levels of said analog signal into quantized binary code parallel binary digit representing signals each level being represented at the analog-to-digital converter output by a binary number comprising a unique plurality of digits, a transmission link means comprising a multielement memory system arrangement including, in parallel, for each digit representing signal;

a memory element provided with controlled input means and including a closed circulating memory loop comprising at least one delay element for each digit representing signal delivering a delayed output signal therefrom with a total time delay greater than a complete image duration time period and being delivered in synchronism with delayed output signals issued in parallel from the other memory elements, and processing and restoring means for continuously receiving said parallel delayed output signals and for delivering a restored analog signal including analog video image signals and synchronization signals for supply to an appropriate display tube.

2. A system according to claim 1 wherein said processing and restoring means comprises a digital-to-analog converter for delivering, on a single output terminal, the said analog video image signal, and synchronization signals.

3. A system according to claim 1 wherein said processing and restoring means comprises two digital-to-analog converters connected to said memory system arrangement outputs, one directly and the other through a digital code translating device in which the digital signal in natural binary code comprising *p* digits, is translated in a signal comprising $p + r$ digits, the converters output being selectively switchable to said display tube.

4. A system according to claim 3 wherein said digital code translating device comprises logic circuit means in which a selected portion of the said delayed output signals representative of an analog amplitude *x* is translated in a digital signal representative of an analog amplitude $1/x$ corresponding an inverted image signal.

5. A system according to claim 1 wherein:

said controlled input means of a memory element comprise input logic gating circuits receiving said quantized binary digit representing signals, clock controlled chopping signals, start/stop control signals and delayed output signals from the said closed loop, said logic gating circuits transmitting either a chopped quantized signal or delayed output signals circulating in the memory loop through a common OR gate connected to the input of the first delay element of the corresponding memory element said memory system including;

a clock means, common for all memory elements of the memory system arrangement and continuously producing said chopping signals and a phase control signal, a control means, common to all memory elements, for producing start/stop timing control signals actuating said input logic circuits, and the actual said memory element, one for each digit of said quantized signals, comprising *m* delay elements each having respective input circuits, and respective outputs, *m* being a positive integer, and *m* signal phase correction circuits, the respectively corresponding delay and phase circuits being series connected in the said closed circulating loop, said phase correction circuits each receiving the said phase control signal, the last one delivering the said memory output signal to the said input logic gating circuits and to the said processing and restoring means.

6. A system according to claim 5 wherein said signal phase correction circuit comprises:

a pulse generator for producing narrow pulses in coincidence with decaying edges of the pulses at the output of the preceding delay element, a first bistable multivibrator having two control inputs, one being connected to said pulse generator and the other to said clock means for triggering the first multivibrator by said narrow pulses and by the rising edge of the clock pulses respectively, a second bistable multivibrator having two control inputs, one being connected to said first bistable output and the other to said clock means for triggering said second multivibrator by the decaying edge of the incoming pulses and by the rising edge of said clock pulses respectively, and a coincidence circuit having two inputs one being connected to said clock means and the other to the second bistable output for delivering the said memory output signal.

7. A system according to claim 5 wherein said *m* delay elements each comprise one magnetostrictive delay line provided with the said input and output circuits.

8. A system according to claim 1 wherein each memory element is supplied through an associated series connected buffer memory under control of a common clock means, the signal portions respectively representative of said image elements being successively processed in said buffer memory before storing and circulating in said memory element.

9. A system according to claim 8, wherein said memory system arrangement further comprises a clock circuit connected to said buffer memories, for supplying writing control signals, and the said common clock means being connected to said buffer memories and to said memory elements, for supplying reading-out control signals to said buffer memories, and control signals to said memory elements, said clock circuit having a synchronization input for being synchronized with said digital signal.

10. A system according to claim 9, wherein said memory elements each comprise a plurality (*r*) of memory circuit elements connected in series in a closed loop, the input terminal of said circuit element being connected to the output of an associated gate circuit said gates having one input terminal connected in parallel to the output of the said buffer memory, one control input connected in parallel to the said synchronization input and the said common clock means and another control input connected to the respective output terminal of a control circuit which counts pulses applied to its input by the said common clock means and delivering advance output pulses signals controlling said gate circuits accordingly to the relative position of the digital image signal portion actually circulating in the said memory circuit elements to which said buffer memory provides said digital signal in a time compressed form.

11. A visual display system for visualizing an image, represented by a video image signal successively representative of different elements of said image, on a visualization tube, said system comprising:

an analog-to-digital converter for converting said video signal to a digital image signal;

a memory arrangement, connected to said converter for storing said digital signal and having outputs for continuously supplying said digital signal while said digital signal is stored in said arrangement; and processing means connected to said outputs for supplying said tube with an analogue image signal;

said memory arrangement comprising, for each digit of said digital signal, *n* delay circuits having respective input circuits and respective outputs, *n* being a positive integer, and *n* phase restoring circuits, having respective outputs, connected in series, said phase restoring circuits being respectively connected at said respective outputs of said delay circuits and the output of the last of said phase restoring circuits being connected to said input circuit of the first of said delay circuits, and a clock circuit connected to said input circuits and to said phase restoring circuits; and said phase restoring circuits each comprising a pulse generator for generating narrow pulses in coincidence with the decaying edges of the pulses at the output of the corresponding delay circuit, a first bistable multivibrator having two control inputs respectively connected to said pulse generator and to said clock circuit for being triggered by said narrow pulses and by the rising edge of the clock pulses, a second bistable multivibrator having two control inputs respectively connected to said first bistable multivibrator and to said clock circuit, for being triggered by the decaying edge of the pulses supplied by said first bistable multivibrator and by the rising edge of said clock pulses, and a coincidence circuit having two inputs respectively connected to said clock circuit and to said second bistable multivibrator.

12. A visual display system for visualizing an image, represented by a video image signal successively representative of different elements of said image, on a visualization tube, said system comprising:

an analog-to-digital converter for converting said video signal to a digital image signal;

a memory arrangement, connected to said converter for storing said digital signal and having outputs for continuously supplying said digital signal while said digital signal is stored in said arrangement; and processing means connected to said outputs for supplying said tube with an analogue image signal;

said memory arrangement comprising for each digit of said digital signal, a buffer memory and a main memory in series, said buffer memories being connected to said converter for storing successively the signal portions respectively representative of said image elements before their storing in said main memories;

said memory arrangement further comprising a first clock circuit connected to said buffer memories, for supplying writing signals, and a second clock circuit connected to said buffer memories and to said main memories, for supplying reading-out signals to said buffer memories and control signals to said main memories, said first clock circuit having a synchronization input for being synchronized with said digital signal; and said main memories each comprising a plurality of memory elements connected in series and having respective inputs, and said memory arrangement further comprising gate circuits having first and second control inputs and connected respectively between said memory element inputs and the output of the corresponding buffer memory, said first control inputs being connected to said synchronization input, and counter means having an input connected to said second clock circuit and outputs respectively connected to said second control inputs for controlling said gate circuits.

* * * * *